INVENTOR
J. F. LYNCH
BY
ATTORNEY

United States Patent Office 3,391,339

Patented July 2, 1968

3,391,339
PHASE-LOCKED QUADRATURE MODULATION TRANSMISSION SYSTEM

John F. Lynch, Whippany, N.J., assignor to Bell Telephone Laboratories, Incorporated, New York, N.Y., a corporation of New York Filed Nov. 6, 1964, Ser. No. 409,442
10 Claims. (Cl. 325—49)

ABSTRACT OF THE DISCLOSURE

Constant frequency pilot signals are added to the intelligence signals at the transmitting terminal of a quadrature modulation transmission system. Signals at the pilot signal frequencies are recovered at the receiving terminal and used to phase control oscillators in synchronous detectors.

This invention relates to transmission systems and in particular to multiplexing systems using quadrature modulation.

The quadrature modulation technique was conceived to conserve transmission bandwidth. In accordance with this technique, a pair of amplitude modulated carrier waves are transmitted within the bandwidth of the amplitude modulated carrier wave having the greater bandwidth.

In brief, a typical quadrature modulation system uses a pair of quadraturely related carrier waves. Each carrier wave is amplitude modulated by a distinct modulating signal. The modulated waves are then linearly added and transmitted to a receiving terminal. At the receiving terminal, received waves at the carrier frequency are used in synchronous detectors to produce pairs of locally generated quadraturely related waves. These locally produced waves are modulated with the received waves to reproduce the original modulating signals.

Several undesirable conditions exist in prior art quadrature modulation systems known to applicant. One of these conditions is that waves at the carrier frequencies must be transmitted in order to produce waves at the same frequencies at the receiving terminals. This requires more power to be used than would otherwise be necessary if these systems could be operated in a suppressed carrier manner.

Another undesirable condition is that crosstalk appearing in the system outputs is in many applications at an objectionable level. Such crosstalk occurs because ideal phase relationships are not present within a system. Crosstalk occurs, for example, when the carrier waves at the transmitter are not in exact phase quadrature. Crosstalk also occurs when the locally generated waves at the receiver are not in phase quadrature. Furthermore, crosstalk occurs because of phase shifts occurring as a result of the nonlinear delay versus frequency characteristics of typical transmission media between the transmitting and receiving terminals.

Figure 4:
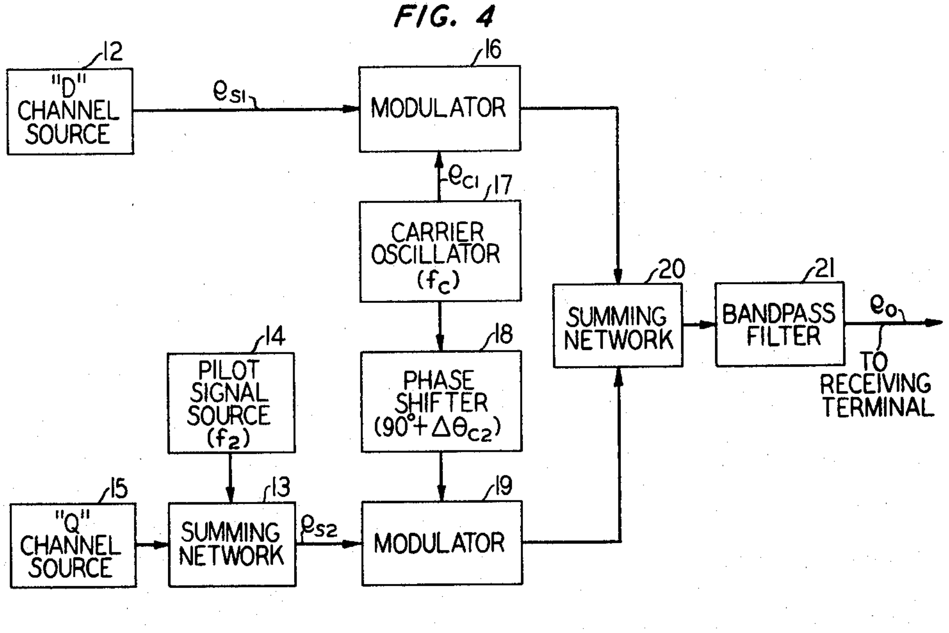

The relationship of crosstalk to phase errors is illustrated in FIG. 11–4 on page 177 of the textbook "Modulation Theory," by H. S. Black, published by D. Van Nostrand Company (1953). As indicated in this textbook, a crosstalk level in the order of minus 60 decibels is obtainable only under ideal conditions and at considerable expense. To applicant's knowledge, the crosstalk level in practical prior art systems is only in the order of minus 20 decibels, which is not acceptable in many applications.

An object of the present invention is to achieve quadrature modulation transmission wherein the transmitted waves are of the double sideband suppressed carrier form.

Another object of the present invention is to reduce crosstalk appearing in the channel outputs of quadrature modulation transmission systems.

These and other objects are achieved in accordance with the invention by adding a unique pilot signal to at least one of the signal inputs at the transmitting terminal of a quadrature modulation system. Furthermore, the transmitting terminal is arranged so that the linearly added modulation waves presented for transmission at the terminal output are of the double sideband suppressed carrier form.

At the receiving terminal, waves at pilot signal frequencies are recovered from the channels and are used in at least one synchronous detector to continuously phase control the substantially quadraturely related waves generated by the detectors. This phase control action not only results in locally produced waves at the carrier frequency but also controls the phases of these waves so as to compensate for substantial portions of the crosstalk occurring in the channels in which the recovered signals appear as crosstalk. This reduction in crosstalk is achieved without further refinements of existing equipment or further improvements in the maintenance of the equipment.

In a preferred embodiment of the invention a pilot signal at a first frequency is inserted in the input of a first channel and a pilot signal at a second frequency is inserted in the input of the remaining or second channel. The resulting waves modulate a pair of quadraturely related carrier waves, respectively, in balanced modulators. The modulation outputs thus produced are linearly added.

In the preferred embodiment two synchronous detectors are provided in the receiving terminal. The control paths for the local carrier generator in one of the synchronous detectors include filters that pass substantially only signals at the second pilot signal frequency. These signals control the local carrier generator so that the second frequency signal appearing as crosstalk in the first channel output of this detector is minimized. At the same time, other second channel signals appearing in the first channel output as crosstalk are also minimized. The first channel output of this detector is used as the first channel output of the terminal.

The control paths of the local carrier generator in the other synchronous detector of this embodiment include filters that pass substantially only signals at the first pilot signal frequency. These signals control the carrier generator in this second detector to minimize the first channel signals appearing as crosstalk in the second channel output of the detector. The second channel output of this detector is used as the second channel output of the receiving terminal.

Over-all system crosstalk in the above-described embodiment has been measured and found to be in the order of minus 60 decibels. This separation is provided without having to provide exactly 90° of phase difference between the carrier waves at the transmitting or receiving terminals. This separation is also provided without having to provide a transmission medium having a linear delay versus frequency characteristic. Furthermore, this separation is maintained with changes in the phase differences and the transmission medium characteristics because of normal aging of the system components. All of this is accomplished because, in accordance with the invention, continuous compensation is provided for crosstalk occurring within the system. The invention therefore permits a substantial improvement in crosstalk to be obtained without further refinements of existing equipment or further improvements in maintenance of the equipment.

In another embodiment of the invention only one pilot signal is used. This signal is inserted in the input of one of the channels at the transmitting terminal. The receiving terminal of this embodiment includes only one synchronous detector, which detector includes filters so that its local carrier generator is controlled by signals at the frequency of the pilot signal. The channel output of the detector opposite to that in which the pilot signal was inserted at the transmitting terminal is used as a system channel output. Crosstalk appearing in this channel, as in the previously described embodiment, is in order of minus 60 decibels.

In this second embodiment, the remaining channel output for the system is obtained by further use of the locally generated wave of the synchronous detector. In particular, the locally generated wave is shifted in phase by a fixed amount equal to the phase difference between the substantially quadraturely related carrier waves at the transmitting terminal. The phase shifted wave is then used in a conventional modulating manner to derive the remaining channel output of the system.

The crosstalk appearing in the remaining channel output of the second embodiment is not compensated to the same extent as crosstalk in the first channel. In particular, compensation is not provided for phase discrepancies occurring between the phase shifting of the remaining channel carrier frequency wave and the phase shifting of the transmitter carrier wave as a result of the component aging. The crosstalk separation in this channel output is, however, substantially better than that obtained in a conventional system, but not necessarily as good as that obtained when using the above-mentioned preferred embodiment.

Other objects and features of the invention will become apparent from a study of the following detailed description of several illustrative embodiments.

Figure 1:
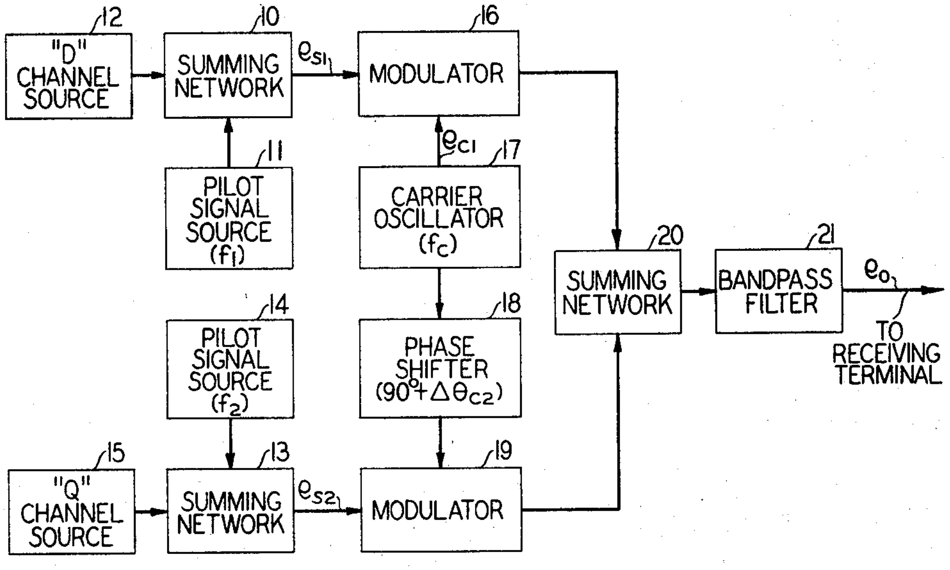
Figure 3:
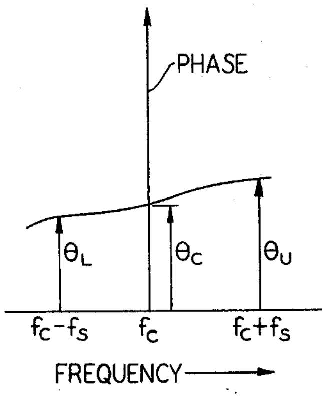
Figure 2:
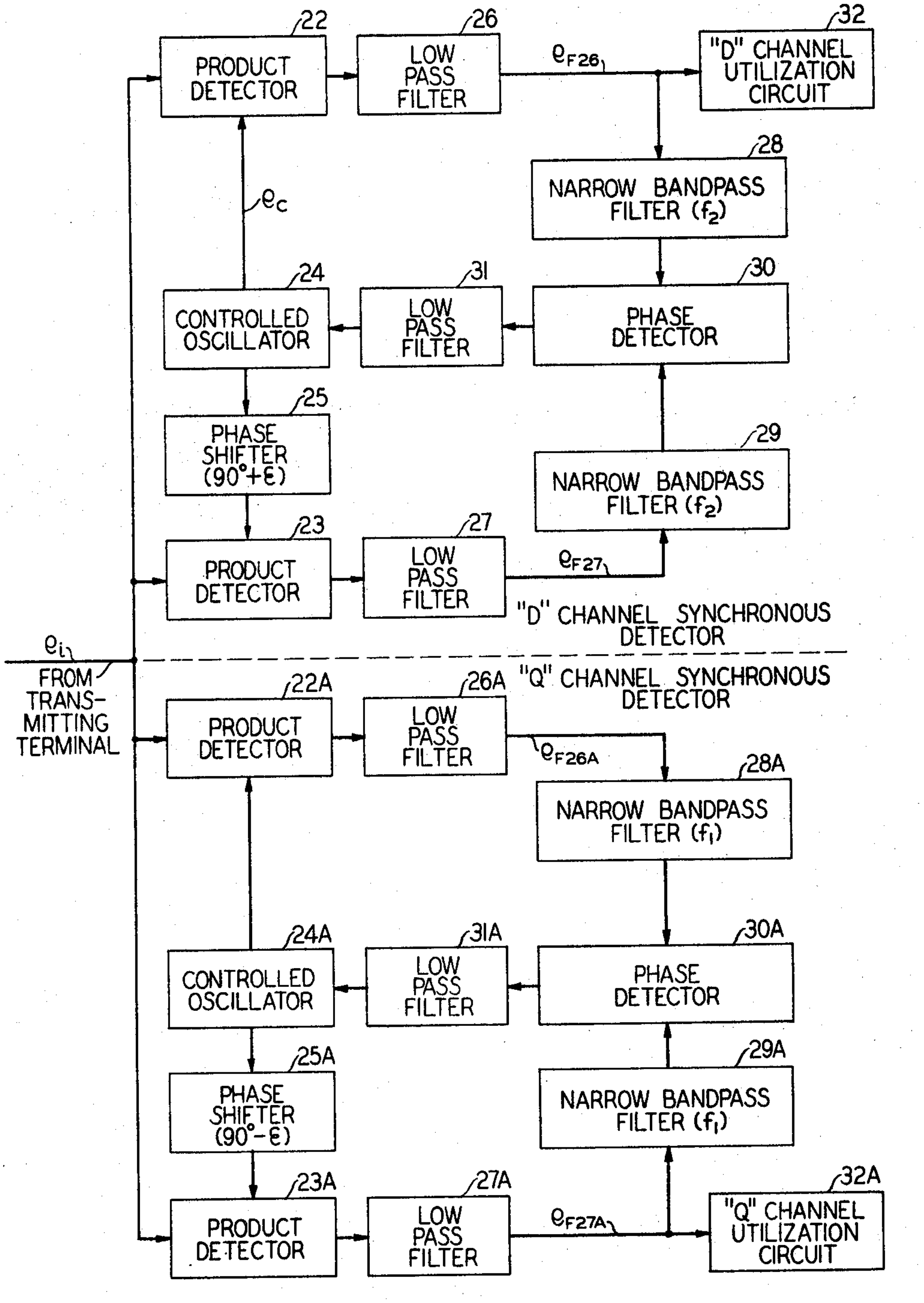
Figure 5:
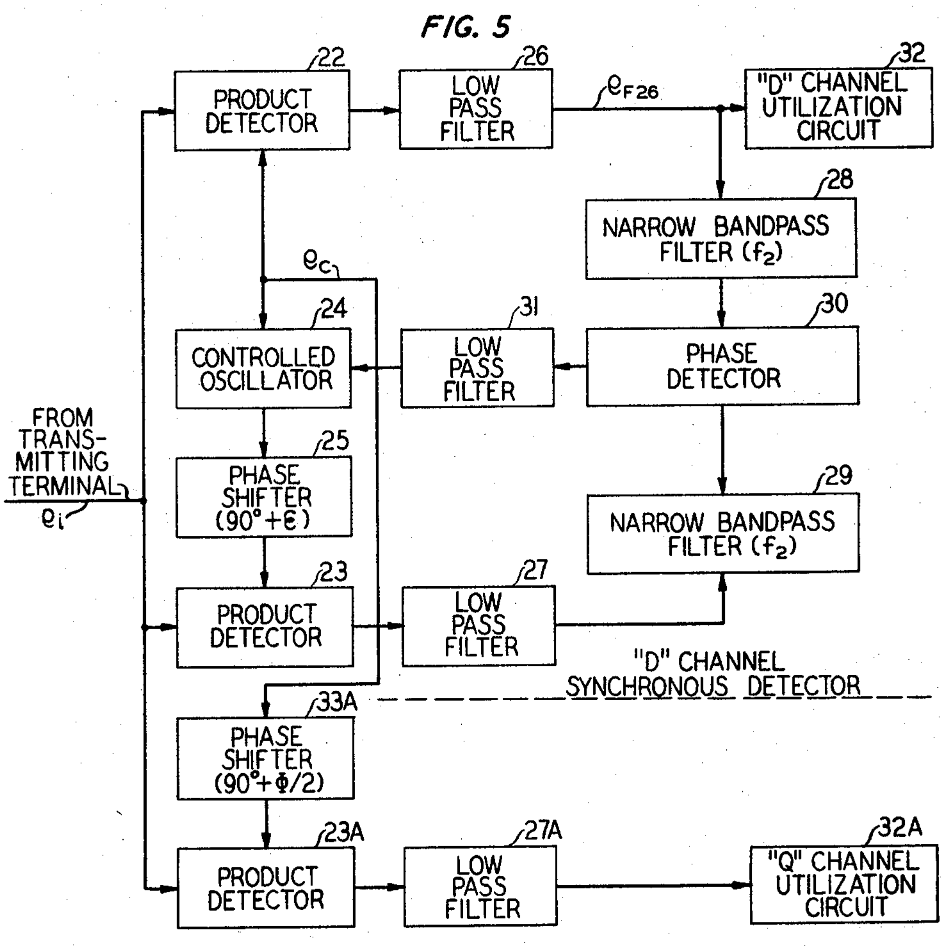

In the drawings:

FIGS. 1 and 2 disclose block diagrams of the transmitting and receiving terminals, respectively, of a preferred embodiment of the invention;

FIG. 3 is a graphical representation of the phase shifting characteristics of a typical transmission medium; and FIGS. 4 and 5 disclose block diagrams of the transmission and receiving terminals, respectively, of another embodiment of the invention.

FIG. 1 is a block diagram of a conventional quadrature modulation transmission terminal which has been modified so that distinct pilot signals are inserted in each of the two channels. In particular, a summing network 10 adds the output at a frequency $f_1$ of a pilot signal source 11 to the output of a "D" channel source 12. Similarly, a summing network 13 adds the output at a frequency $f_2$ of a pilot signal source 14 to the output of a "Q" channel source 15. (The letters "D" and "Q" are used to indicate the directly and quadraturely modulated sides of the system.) The output from summing network 10 is applied to an amplitude modulator 16 to modulate a carrier wave at a frequency $f_c$ from an oscillator 17. The same carrier wave shifted in phase by approximately 90° by a phase shifter 18 is modulated in an amplitude modulator 19 by the output from summing network 13. A summing network 20 sums the outputs from modulators 16 and 19 and applies its output to a bandpass filter 21. Filter 21 passes substantially only the upper and lower sidebands of the modulator outputs. The double sideband suppressed carrier output of filter 21 is transmitted to the receiving terminal shown in FIG. 2.

The receiving terminal of FIG. 2 comprises two conventional synchronous detectors which have been modified so that the control paths for their local carrier oscillators are responsive only to signals at the frequencies of the two pilot signals, respectively. (A recently published simplified discussion and diagram of the conventional synchronous detector appear on page 40 of the August 1964 issue of Electronics World.)

The upper or "D" channel synchronous detector comprises a pair of product detectors 22 and 23 to which signals received from the transmitting terminal are applied. The output of a controlled oscillator 24 is applied directly to product detector 22, while the same output phase shifted by approximately 90° by a phase shifter 25 is applied to product detector 23. The higher frequency components in the outputs of detectors 22 and 23 are suppressed by low-pass filters 26 and 27, respectively.

Filters 28 and 29, which have narrow bandpass characteristics centered at the frequency $f_2$, filter out signals at the frequency $f_2$ in the outputs of filters 26 and 27, respectively. The outputs from filters 28 and 29 are modulated in a phase detector 30. A low-pass filter 31 filters out the direct current component in the output of detector 30 and applies this component as a control voltage to oscillator 24. As will become apparent from a subsequent detailed discussion, the control signal applied to oscillator 24 causes the phase of the oscillator output to be of a nature to minimize the output from filter 28.

The output of filter 26 is also applied to a "D" channel utilization circuit 32. This output is substantially the same as the output of "D" channel source 12 in the transmitting terminal of FIG. 1.

As the lower or "Q" channel synchronous detector of FIG. 2 differs in only two respects from the "D" channel synchronous detector, similar circuit components have been assigned the same symbols as used in the "D" channel detector with the addition of the letter A in order to distinguish between the two detectors.

The "Q" channel synchronous detector differs from the "D" channel detector in that filters 28A and 29A have a pass band characteristic centered at frequency $f_1$ instead of frequency $f_2$. This causes the control signal applied to oscillator 24A to control the phase of the oscillator output in such a manner to minimize the output from filter 29A.

The only other difference between the two detectors is that low-pass filter 27A is connected to "Q" channel utilization circuit 32A. This output is substantially the same as the output of "Q" channel source 11 in the transmitting terminal of FIG. 1.

The manner in which the embodiment of FIGS. 1 and 2 operates to provide a crosstalk separation in the order of minus 60 decibels is now explained. Although an attempt has been made to keep this explanation as simple as possible, it is still relatively detailed. The primary reason for this detail is that an attempt has been made to include all potential sources of phase shift in order to demonstrate the full effectiveness of the invention.

Let the inputs to modulators 16 and 19 of FIG. 1 be represented by:

$$e_{s1}=E_{s1}\cos\omega_{s1}t \qquad (1)$$

and $$e_{s2}=E_{s2}\cos\omega_{s}t \qquad (2)$$

respectively.

The double sideband suppressed carrier output of filter 21 is then:

$$e_o=\frac{E_{s1}E_{c1}}{2}(\cos[\omega_{c1}t+\theta_{c1}+\omega_{s1}t]+\cos[\omega_{c1}t+\theta_{c1}-\omega_{s1}t])+\frac{E_{s2}E_{c1}}{2}(\sin[\omega_{c1}t+\theta_{c1}+\Delta\theta_{c2}+\omega_{s2}t]+\sin[\omega_{c1}t+\theta_{c1}+\Delta\theta_{c2}-\omega_{s2}t]) \qquad (3)$$

where $\omega_{c1}$=angular frequency of the carrier wave
$\theta_{c1}$=arbitrary phase of the carrier wave
$\Delta\theta_{c2}$=phase error in 90° shifter 18.

The output of the transmitting terminal is transmitted over a transmission medium which is assumed to have an arbitrary phase characteristic as shown in FIG. 3. The "D" and "Q" channel upper and lower sidebands are therefore shifted in phase by $\theta_U$ and $\theta_L$, respectively. The input at the receiving terminal of FIG. 2 is therefore:

$$e_i=\frac{E_{s1}E_{c1}}{2}(\cos[\omega_{c1}t+\theta_{c1}+\theta_U+\omega_{s1}t]+\cos[\omega_{c1}t+\theta_{c1}+\theta_L-\omega_{s1}t])+\frac{E_{s2}E_{c1}}{2}(\sin[\omega_{c1}t+\theta_{c1}+\theta_U+\Delta\theta_{c2}+\omega_{s2}t]+\sin[\omega_{c1}t+\theta_{c1}+\theta_L+\Delta\theta_{c2}-\omega_{s2}t]) \quad (4)$$

The output of controlled oscillator 24 is of the form:

$$e_c=E_c\cos[\omega_{c1}t+\theta_{c1}+\theta_c+\Delta\varphi] \quad (5)$$

where $\theta_c$=phase introduced by the transmission medium (see FIG. 3) at the carrier frequency, and $\Delta\psi$=phase difference between the output of oscillator 24 and what would be the received carrier waves if the carrier waves were not suppressed at the transmitter.

(The reason for representing the phase angle as comprising the three indicated components will become apparent shortly.)

Filter 26 filters the output of product detector 22 in order to attenuate the higher frequency signals, and produces:

$$e_{F26}=\frac{E_{s1}E_{c1}E_c}{4}(\cos[\omega_{s1}t+\theta_U-\Delta\psi-\theta_c]+\cos[-\omega_{s1}t+\theta_L-\Delta\psi-\theta_c])+\frac{E_{s2}E_{c1}E_c}{4}(\sin[\omega_{s2}t+\theta_U+\Delta\theta_{c2}-\Delta\psi-\theta_c]+\sin[-\omega_{s2}t+\theta_L+\Delta\theta_{c2}-\Delta\psi-\theta_c]) \quad (6)$$

The above expression for $e_{F26}$ may be put into a more usable form by expanding the arbitrary phase characteristic of the transmission medium (which contributed $\theta_U$, $\theta_L$ and $\theta_c$ in the above expression) as a Taylor series about the frequency $f_c$ (see FIG. 3). Such a treatment results in:

$$\theta_U=\theta(f_c)+a_1f_s+a_2f_s^2+a_3f_s^3+\dots$$

$$\theta_L=\theta(f_c)-a_1f_s+a_2f_s^2-a_3f_s^3+\dots$$

When the above is expressed in a simpler form, the result is:

$$\theta_U=\theta_c+\theta_e+\theta_o \quad (7)$$

$$\theta_L=\theta_c+\theta_e-\theta_o \quad (8)$$

where $$\theta_c=\theta(f_c)$$

$$\theta_e=\sum_{N=1}a_{2N}f_s^{2N} \text{ (even contribution to phase)}$$

$$\theta_o=\sum_{N=1}a_{2N-}f_s^{2N-1} \text{ (odd contribution to phase)}$$

When the values of Equations 7 and 8 are placed in Equation 6, the following equation results:

$$e_{F26}=\frac{E_{s1}E_{c1}E_c}{2}\cos[\theta_e-\Delta\psi]\cos[\omega_{s1}t+\theta_o]+\frac{E_{s2}E_{c1}E_c}{2}\sin[\theta_e+\Delta\theta_{c2}-\Delta\psi]\cos[\omega_{s2}t+\theta_o] \quad (9)$$

In a similar manner, the output of filter 27 is:

$$e_{F27}=-\frac{E_{s1}E_{c1}E_c}{2}\sin[\theta_e-\epsilon-\Delta\psi]\cos[\omega_{s1}t+\theta_o]+\frac{E_{s2}E_{c1}E_c}{2}\cos[\theta_e+\Delta\theta_{c2}-\epsilon-\Delta\psi]\cos[\omega_{s2}t+\theta_o] \quad (10)$$

where $\epsilon$=error in phase shifter 25.

Equations 9 and 10 represent the outputs from filters 26 and 27 when the oscillator inputs to product detectors 22 and 23 are almost in quadrature with one another (they differ by the error $\epsilon$).

It is important at this point to recognize that the second term to the right of the equals sign of Equation 9 is a representation of the crosstalk from the "Q" channel into the "D" channel, while the first term represents the desired signal output for the "D" channel. Similarly, the first term to the right of the equals sign of Equation 10 represents the crosstalk from the "D" channel into the "Q" channel while the second term represents the desired signal. Furthermore, signals at the $f_2$ pilot signal frequency are present in each of the second terms of Equations 9 and 10 because this frequency component is included in the $\omega_{s2}$ expression. (This is readily appreciated by referring back to Equation 1 and FIG. 1.)

The signals at the $f_2$ pilot signal frequency are filtered out of $e_{F26}$ and $e_{F27}$ by narrow bandpass filters 28 and 29, respectively. These signals are modulated in phase detector 30 and result in an output having the following direct current component:

$$e_\Phi(dc)=\left(\frac{E_{s2}E_{c1}E_c}{2}\right)^2\cos\Delta\theta_F(\sin[2(\theta_e+\Delta\theta_{c2}-\Delta\psi)-\epsilon]+\sin\epsilon) \quad (11)$$

where $\Delta\theta_F$=a phase error introduced because of any nonsymmetry between filters 28 and 29.

The value of $\Delta\psi$ which causes $e_\Phi$ (dc) to equal zero is:

$$\Delta\psi=\theta_e(f_2)+\Delta\theta_{c2} \quad (12)$$

It should be noted that the value of $\Delta\psi$ which makes $e_\Phi$ (dc) equal zero is independent of $\epsilon$, the error in the receiver 90° phase shift network 25, and of $\Delta\theta_F$, the phase error introduced by filters 28 and 29. ($\Delta\theta_F$ affects the sensitivity of the voltage controlled oscillator.) This result relaxes requirements for such components in an actual system. From Equation 12 it is apparent that the phase difference $\Delta\psi$ between oscillators 17 and 24 is a function of the even order contribution to phase by the transmission medium (see Equations 7 and 8) and the error $\Delta\theta_{c2}$ in the transmitting terminal 90° phase shift network 18.

The above results may now be used to calculate the crosstalk in the output on the "D" channel side of the "D" channel synchronous detector. With reference to Equation 9 it was previously stated that the second term represents the crosstalk from the "Q" channel to the "D" channel. The expression for the crosstalk may therefore be derived by placing the second term over the first term. When this is done, the result is:

$$\text{crosstalk}=\frac{E_{s2}\cos[\omega_{s2}t+\theta_o]}{E_{s1}\cos[\omega_{s1}t+\theta_o]}\cdot\frac{\sin\Delta\theta_e}{\cos[\Delta\theta_e-\Delta\theta_{c2}]} \quad (13)$$

where $\Delta\theta_e=\theta_e(f)-\theta_e(f_2)$, which is the phase difference between the phase departures at the immediate signal frequency $f$ and pilot frequency $f_2$ due to even order phase contributions in the transmission medium.

From Equation 13 it is seen that the basic contribution to crosstalk in the output on the "D" channel side is caused by a departure in the even-order contribution to phase in the transmission medium. (Although crosstalk is also a function of $\Delta\theta_{c2}$, a value of $\Delta\theta_{c2}$ in the order of 10° contributes little to crosstalk because $\Delta\theta_{c2}$ is the argument of the cosine function.) Furthermore, from Equation 13, it is found that for a crosstalk margin of 60 decibels, the maximum value of $\Delta\theta_e$ is approximately one-twentieth of a degree.

The "D" channel output is given in Equation 9. When the value of $\Delta\psi$ in Equation 12 is placed in Equation 9, the following expression is produced:

$$e_{F26}=\frac{E_{s1}E_{c1}E_c}{2}\cos[\Delta\theta_e-\Delta\theta_{c2}]\cos[\omega_{s1}t+\theta_o]+\frac{E_{s2}E_{c1}E_c}{2}\sin[\Delta\theta_e]\cos[\omega_{s2}t+\theta_o] \quad (14)$$

It will be noted from Equation 14 that a reduction in the amplitude of the desired signal (the first term to the right of the equals sign) by the factor cos $[\Delta\theta_e - \Delta\theta_{c2}]$ results. However, this reduction will be less than 0.2 db for practical values of $\Delta\theta_e$ and $\Delta\theta_{c2}$. The crosstalk which occurs can only be due to the difference in the phase departures at frequencies $f$ and $f_2$ due to even-order contributions to phase while odd-order contributions to phase produce a phase shift in the detected output signal. Phase errors in the 90° phase shift network 25 at the receiving terminal do not affect the detected signal output but rather the effects are reflected to the output of its quadrature counterpart ($e_{F27}$). In other words, these effects are transferred to the "Q" channel output of this synchronous detector, which output is not used as a system output. Further, crosstalk is rendered substantially independent of the phase error $\Delta\theta_{c2}$ in the 90° carrier phase shift network 18 at the transmitting terminal.

The input to the "Q" channel synchronous detector is the same as the input to the "D" channel synchronous detector. The operations for the expressions are similar to those presented above. Some of the more important expressions are:

$$e_{F26A} = \frac{E_{s1}E_{c1}E_c}{2}\cos[\theta_c - \Delta\theta_{c2} - \epsilon - \Delta\psi]\cos[\omega_{s1}t + \theta_o] + \frac{E_{s2}E_{c1}E_c}{2}\sin[\theta_c - \epsilon - \Delta\psi]\cos[\omega_{s2}t + \theta_o] \quad (15)$$

$$e_{F27A} = -\frac{E_{s1}E_{c1}E_c}{2}\sin[\theta_c - \Delta\theta_{c2} - \Delta\psi]\cos[\omega_{s1}t + \theta_o] + \frac{E_{s2}E_{c1}E_c}{2}\cos[\theta_c - \Delta\psi]\cos[\omega_{s2}t + \theta_o] \quad (16)$$

$$\Delta\psi = \theta_e(f_1) - \Delta\theta_{c2} \quad (17)$$

$$\text{crosstalk} = \frac{E_{s1}\cos[\omega_{s1}t + \theta_o]}{E_{s2}\cos[\omega_{s2}t + \theta_o]} \cdot \frac{\sin[\Delta\theta_e]}{\cos[\Delta\theta_e + \Delta\theta_{c2}]} \quad (18)$$

where $$A\theta_e = \theta_e(f) - \theta_e(f_1)$$

and (when the value of $\Delta\psi$ from Equation 17 is placed in Equation 15)

$$e_{F27A} = -\frac{E_{s1}E_{c1}E_c}{2}\sin[\Delta\theta_e]\cos[\omega_{s1}t + \theta_o] + \frac{E_{s2}E_{c1}E_c}{2}\cos[\Delta\theta_e + \Delta\theta_{c2}]\cos[\omega_{s2}t + \theta_o] \quad (19)$$

It will be noted from Equation 19 that the reduction in the desired signal output (the second term to the right of the equals sign) of the "Q" channel by an amplitude factor cos $[\Delta\theta_e + \Delta\theta_{c2}]$ is similar to the amplitude factor cos $[\Delta\theta_e - \Delta\theta_{c2}]$, for the "D" channel output. Further, observe that the desired signal output is independent of "$\epsilon$," the error in the 90° phase shift network 25A at the receiving terminal, but is reflected in the output expression of its quadrature counterpart ($e_{F26A}$). In other words, this error is confined to the "D" channel output of the synchronous detector which output is not used as a system output. Finally, the crosstalk is substantially independent of $\Delta_{c2}$ and is only present because of the difference in the phase departures at frequencies $f$ and $f_1$ due to even-order contributions to phase in the transmission medium which occurs over the signal bandwidth.

As mentioned previously, an attempt has been made in the above explanation to include all potential sources of phase shift that result in crosstalk in conventional quadrature modulation systems. The explanation demonstrates that the disclosed embodiment of FIGS. 1 and 2 provides automatic compensation for all but two of such phase shifts. One of these two phase shifts is the error $\Delta\theta_{c2}$ introduced by phase shifter 18 of the transmitting terminal. As already discussed, this error appears in the crosstalk expression as the argument of a cosine function. As this error is readily maintainable below 10°, its contribution to crosstalk is negligible.

The other of the two phase shifts is the *difference* in the phase departures of an information signal and a pilot signal due to the even-order contributions to phase shifts by the transmission medium. As this *difference* does not exceed one-twentieth of a degree over typical transmission media, crosstalk separation in the order of 60 decibels is readily achieved by the embodiment shown in FIGS. 1 and 2.

The embodiment of the invention shown in FIGS. 4 and 5 is similar in many respects to the one shown in FIGS. 1 and 2. In view of this similarity, identical elements are identified by the same symbols used in the previous described embodiment.

The transmitting terminal of FIG. 4 differs from that of FIG. 1 in that a pilot signal is not inserted in the "D" channel; in other words, summing network 10 and pilot signal source 11 of FIG. 1 are not present in FIG. 4. The operation of this terminal is therefore identical with that of FIG. 1 with the exception that a pilot signal is not inserted in the "D" channel.

The "D" channel portion of the receiving terminal of FIG. 5 is identical to the "D" channel portion of the receiving terminal of FIG. 2. The previously presented discussion with respect to the operation of the "D" channel portion of the terminal of FIG. 2 applies to the present embodiment. Crosstalk from "Q" channel is therefore still in the order of minus 60 decibels.

The "Q" channel in the receiving terminal of FIG. 5 does not include a synchronous detector. It does, however, include a product detector 23A and a low-pass filter 27A identical to those in FIG. 2. As in FIG. 2, the receiving terminal input is applied to detector 23A while the higher frequency components in the detector output are attenuated by filter 27A before the output is applied to "Q" channel utilization circuit 32A.

The locally generated carrier frequency waves for use in detector 23A are obtained from controlled oscillator 24 in the "D" channel synchronous detector. In particular, the output of oscillator 24 is phase shifted by a phase shifter 33A and applied to detector 23A. Phase shifter 33A produces a phase shift substantially equal to that produced by phase shifter 18 of the transmitting terminal of FIG. 4.

The phase shift produced by shifter 33A may be adjusted to the desired amount by any one of several different techniques. A preferred technique is to introduce a pilot signal in the "D" channel (as shown in FIG. 1) and adjust phase shifter 33A so that the output of filter 27A is a minimum at the frequency of the pilot signal.

When phase shifter 33A produces the desired phase shift, the crosstalk level in the "Q" channel output is in the order of minus 60 decibels. Aging changes in phase shifters 18 and 33A will cause this crosstalk separation to decrease. The "Q" channel will, however, still have better crosstalk separation than present in conventional systems because the "D" channel synchronous detector corrects for the remaining phase shifts previously discussed.

Although several specific embodiments of the invention have been described, various other embodiments may be devised by those skilled in the art without departing from the spirit and scope of the invention.

What is claimed is:

1. A transmission system comprising
a transmitting terminal for amplitude modulating a pair of substantially quadraturely related carrier waves by intelligence waves from a pair of sources, respectively, linearly adding together the waves produced by modulating said carrier waves and transmitting the linearly added waves, a receiving terminal having at least one synchronous detector for receiving waves transmitted by said transmitting terminal and recovering said intelligence waves from the received waves, means in said transmitting terminal linearly adding to the intelligence waves from at least one of said sources a pilot signal wave of a substantially fixed frequency uniquely associated with that source and recoverable to the substantial exclusion of intelligence waves of that source, where the waves modulated have the general form $e_S=E_S \cos \omega_S t$, means in said transmitting terminal restricting said waves transmitted by said transmitting terminal to substantially only those having frequencies within the double sidebands of said waves produced by modulating said carrier waves, and means in said receiving terminal restricting control of said synchronous detector to waves of said frequency of said pilot signal wave to reduce to substantially zero the waves at said pilot signal frequency which occur in one of said recovered intelligence waves as crosstalk.

2. A transmission system for transmitting intelligence waves from a pair of sources at a transmitting terminal to a receiving terminal said transmitting terminal comprising:

a source of substantially quadraturely related carrier waves, a pair of modulators of the balanced type where waves at the carrier frequency are substantially absent in the modulator outputs, means connecting said carrier waves source to said modulators so that said quadraturely related carrier waves are applied to said modulators, respectively, means connecting said sources of intelligence waves to said modulators, respectively, means connected to the last-mentioned means to linearly add to the intelligence waves from at least one of said sources a pilot signal wave at a frequency uniquely related to that source and recoverable to the substantial exclusion of intelligence waves of that source, where the waves modulated have the general form $e_S=E_S \cos \omega_S t$, means connected to said modulators to linearly combine the modulator outputs, and means connected to said combining means to transmit the combined modulator outputs; and said receiving terminal comprising:

at least one synchronous detector including a phase controlled oscillator and oscillator control loops responsive only to signals at the frequency of said pilot signal wave, and an output terminal connected to the output of said detector in which said signals responded to by said control loops appear as crosstalk.

3. In a transmission system as set forth in claim 2, means to phase shift the output of the synchronous detector oscillator by an amount substantially equal to the phase difference between the quadraturely related carrier waves at said transmitting terminal, means to modulate said phase shifted oscillator output with input signals to said synchronous detector, and an output terminal connected to the output of said last-mentioned means.

4. A carrier transmission system comprising a transmitting terminal that transmits a pair of substantially quadraturely related carrier waves modulated by intelligence waves from a pair of sources, respectively, a receiving terminal having at least one synchronous detector for recovering said intelligence waves from the waves received from said transmitting terminal, means in said transmitting terminal linearly adding to the intelligence waves from at least one of said sources a pilot signal wave of a substantially fixed frequency uniquely associated with that source and recoverable to the substantial exclusion of intelligence waves of that source, where the waves modulated have the general form $e_S=E_S \cos \omega_S t$, means in said transmitting terminal substantially preventing waves of the frequency of said carrier waves from being transmitted by said transmitting terminal, and means in said receiving terminal restricting control of said synchronous detector to waves of said frequency of said pilot signal waves to reduce to substantially zero the waves at said pilot signal frequency which occur in one of said recovered intelligence waves as crosstalk.

5. In a carrier transmission system in which substantially quadraturely related carrier waves are modulated by the outputs of two sources, respectively, linearly combined and then transmitted from a transmitting terminal to a receiving terminal, means in said transmitting terminal to add to the output of at least one of said sources a pilot signal at a substantially fixed frequency unique to that source and recoverable to the substantial exclusion of the output of that source, where the waves modulated have the general form $e_S=E_S \cos \omega_S t$, means in said transmitting terminal to substantially prevent waves at the frequency of said carrier waves from being transmitted, means in said receiving terminal to generate at least one pair of substantially quadraturely related waves, means to modulate signals received from said transmitting terminal with said pair of substantially quadraturely related waves to produce first and second outputs, means to recover signals at substantially only said pilot signal frequency from each of said first and second outputs, means to modulate said signal recovered from said first output with said signal recovered from said second output, means responsive only to the direct current component output of said means to modulate said signals recovered from said first and second outputs to control said means generating said substantially quadraturely related waves producing said recovered signals to reduce said direct current component to a minimum level, and output terminals connected to said means to modulate signals received from said transmitting terminal to make available its output in which said recovered signal at said pilot signal frequency appears as crosstalk.

6. In a carrier transmission system as set forth in claim 5, means to phase shift the receiving terminal quadraturely related wave producing said output applied to said output terminals by an amount substantially equal to the phase difference between said transmitting terminal quadraturely related carrier waves, means to modulate said last-mentioned phase shifted wave with said signals received from said transmitting terminal, and an output terminal connected to the output of said last-mentioned means.

7. A carrier transmission system comprising first and second sources of information to be transmitted, means producing at least one pilot signal, means adding said pilot signal to the output of one of said information sources, said information source outputs after said pilot signal has been added having the general form $e_S=E_S \cos \omega_S t$, said pilot signal having a frequency uniquely related to the last-mentioned source and recoverable to the substantial exclusion of the output of that source, a source of substantially quadraturely related carrier waves,
means modulating said carrier waves by said information source outputs after said pilot signal has been added,
means linearly adding the outputs produced by said modulating means,
means transmitting substantially only the signals having frequencies in the double sidebands of said modulating means outputs,
means receiving said transmitted waves,
said receiving means comprising at least one synchronous detector having a frequency controlled oscillator and a controlled loop restricting the control of said oscillator to substantially only signals at said pilot signal frequency, and
output terminals connected to the output of said detector in which output said signals at said pilot signal frequency appears as crosstalk.

8. A transmission system in accordance with claim 7 in combination with
means phase shifting the output of said synchronous detector oscillator by an amount substantially equal to the phase difference between said quadraturely related carrier waves,
means modulating said phase shifted oscillator output with the input signals to said synchronous detector, and
output terminals connected to the output of said last-mentioned means.

9. A carrier transmission system comprising a transmitting terminal and a receiving terminal,
said transmitting terminal comprising:
first and second sources of information to be transmitted,
a source producing a pilot signal,
means adding said pilot signal to the output of one of said information sources, said information source outputs after said pilot signal has been added having the general form $e_s=E_s \cos \omega_s t$,
said pilot signal having a frequency uniquely related to the last-mentioned source and recoverable to the substantial exclusion of the output of that source,
a source of substantially quadraturely related carrier waves,
a pair of balanced modulators modulating said carrier waves by said information source output to which said pilot signal has been added and by the remaining said information source output, respectively,
means linearly adding the outputs produced by said modulators, and
means transmitting the output of said linearly adding means; and
said receiving terminal comprising:
means generating a pair of substantially quadraturely related waves,
means modulating waves received from said transmitting terminal with said pair of substantially quadraturely related waves to produce first and second outputs,
means recovering signals at said pilot signal frequency from each of said first and second outputs,
means modulating a first of said recovered signals with the other of said recovered signals,
means responsive to the direct current component output of the last-mentioned modulating means and controlling said means generating said pair of substantially quadraturely related waves to reduce said direct current component to a minimum level,
an output terminal connected to the output of said means modulating waves received from said transmitting terminal with said receiving terminal quadraturely related waves in which output said last-mentioned recovered signals at said pilot signal frequency appear as crosstalk,
means phase shifting said quadraturely related wave applied to said modulating means connected to said output terminal by an amount substantially equal to the phase difference between said quadraturely related carrier waves,
means modulating said last-mentioned phase shifted wave with said received signals, and
an output terminal connected to the output of said last-mentioned means.

10. A carrier transmission system comprising a transmitting terminal and a receiving terminal,
said transmitting terminal comprising:
first and second sources of information to be transmitted,
means producing a pair of pilot signals at first and second frequencies, respectively,
means adding said pilot signals to the outputs of said information sources, respectively, to produce waves of the general form represented by $e_s=E_s \cos \omega_s t$,
a source of substantially quadraturely related carrier waves,
a pair of balanced modulators modulating said carrier waves by said information source outputs to which said pilot signals have been added, respectively,
means linearly adding the outputs produced by said modulators, and
means transmitting the output of said linearly adding means; and
said receiving terminal comprising:
means generating two pairs of substantially quadraturely related waves,
means modulating waves received from said transmitting terminal with said pairs of substantially quadraturely related waves to produce first and second pairs of outputs, respectively,
means recovering signals at said first pilot signal frequency from each output in one of said pairs of outputs and at said second pilot signal frequency from each output in the other of said pairs of outputs,
means modulating said recovered signals at said first pilot signal frequency and modulating said recovered signals at said second pilot signal frequency,
means responsive to the direct current component outputs of said modulating means and controlling said means generating said pairs of substantially quadraturely related waves to reduce said direct current components to minimum levels, and
output terminals connected to the outputs of said last-mentioned modulating means in which outputs said last-mentioned recovered signals at said pilot signal frequency appear as crosstalk.

References Cited

UNITED STATES PATENTS

| | | | |
|---|---|---|---|
| 2,256,317 | 9/1941 | Earp | 179—15 X |
| 2,719,189 | 9/1955 | Bennett et al. | 179—15 |
| 2,965,717 | 12/1960 | Bell | 325—49 |
| 3,030,449 | 4/1962 | Geneve | 179—15 |
| 3,134,855 | 5/1964 | Chasek | 325—60 X |
| 3,084,328 | 4/1963 | Groeneveld et al. | 325—49 |
| 3,289,082 | 11/1966 | Schumate | 325—60 X |

ROBERT L. GRIFFIN, *Primary Examiner.*

JOHN W. CALDWELL, *Examiner.*

B. V. SAFOUREK, *Assistant Examiner.*